(12) United States Patent
Nalder

(10) Patent No.: US 6,614,931 B1
(45) Date of Patent: Sep. 2, 2003

(54) HANDWRITTEN INSTRUCTIONS FOR MESSAGING APPLIANCES

(75) Inventor: Gregory T. Nalder, Meridian, ID (US)

(73) Assignee: Hewlett-Packard Development Company, LP., Houston, TX (US)

( * ) Notice: Subject to any disclaimer, the term of this patent is extended or adjusted under 35 U.S.C. 154(b) by 0 days.

(21) Appl. No.: 09/169,237

(22) Filed: Oct. 8, 1998

(51) Int. Cl.[7] .............................. G06K 9/00; G06K 9/18; G06K 9/60; H04N 1/00; H04N 1/36
(52) U.S. Cl. ..................... 382/187; 382/101; 382/102; 382/181; 382/185; 382/186; 382/305; 382/321; 358/400; 358/402; 358/403; 358/405; 358/440
(58) Field of Search ......................... 382/181, 187, 382/100, 101, 102, 185, 186, 198, 305, 321; 358/400, 402, 405, 440, 403, 438, 439

(56) References Cited

U.S. PATENT DOCUMENTS

| | | | | |
|---|---|---|---|---|
| 4,631,597 A | * | 12/1986 | Ogawa ........................ | 358/425 |
| 4,654,718 A | * | 3/1987 | Sueyoshi ............... | 379/100.07 |
| 4,941,170 A | * | 7/1990 | Herbst ......................... | 379/100 |
| 5,091,790 A | * | 2/1992 | Silverberg ................... | 358/434 |
| 5,287,199 A | * | 2/1994 | Zoccolillo ................... | 358/402 |
| 5,461,488 A | * | 10/1995 | Witek .......................... | 358/402 |
| 5,465,167 A | * | 11/1995 | Cooper et al. .............. | 358/468 |
| 5,513,013 A | * | 4/1996 | Kuo ............................. | 358/448 |
| 5,546,538 A | * | 8/1996 | Cobbley et al. ............ | 709/203 |
| 5,663,808 A | * | 9/1997 | Park ........................... | 358/440 |
| 5,805,298 A | * | 9/1998 | Ho et al. ..................... | 358/402 |
| 5,838,458 A | * | 11/1998 | Tsai ............................ | 358/402 |
| 5,892,591 A | * | 4/1999 | Anglin, Jr. et al. .......... | 358/407 |
| 5,909,509 A | * | 6/1999 | Chiang et al. .............. | 382/228 |
| 5,940,187 A | * | 8/1999 | Berke ......................... | 358/434 |
| 5,974,414 A | * | 10/1999 | Stanczak et al. ............... | 707/6 |
| 6,006,351 A | * | 12/1999 | Peretz et al. ................ | 714/751 |
| 6,075,844 A | * | 6/2000 | Goldberg et al. ........ | 379/88.17 |
| 6,104,500 A | * | 8/2000 | Alam et al. ................ | 358/1.15 |
| 6,188,766 B1 | * | 2/2001 | Kocher ....................... | 380/246 |
| 6,344,906 B1 | * | 2/2002 | Gatto et al. ................ | 358/443 |

OTHER PUBLICATIONS

Hui, et al. "A Distributed Fax Messaging System", IEEE, pp. 393–397, 1995.*

* cited by examiner

Primary Examiner—Daniel G. Mariam (57) ABSTRACT

A messaging device has a message reception component configured to receive a printable message from a message originator, and a printer that prints the received message and that also prints an origin identifier of the message originator on the print medium. After the message is printed, a user marks it up for reply to the message originator. The messaging device has an optical scanner and optical recognition logic that detects the origin identifier and that instructs the messaging device to send the annotated message back to the message originator. In addition, the optical recognition logic recognizes instructions written on handwritten cover sheets. By preparing such a cover sheet with handwritten instructions, a user can instruct the message device regarding various transmission parameters such as recipients and recipients' telephone or facsimile numbers.

18 Claims, 6 Drawing Sheets

TO: THOMAS HANDER
FROM: DANIEL JONES
DATE: 2/27/98
SUBJ: PROPOSED MEETING

THOMAS: ARE YOU AVAILABLE FOR A MEETING AT 10AM TOMORROW AT HEADQUARTERS IN SAN FRANSISCO?

*Dan*

HANDWRITTEN INSTRUCTIONS FOR MESSAGING APPLIANCES

TECHNICAL FIELD

The invention relates to messaging appliances such as facsimile machines, and to methods of providing transmission parameters to such appliances.

BACKGROUND OF THE INVENTION

Despite the increasing use of computers and associated technologies, a large percentage of business activities and communications are documented on paper. This brings about a continued need for transferring both physical and electronic copies of paper documents.

In the past, paper documents were exchanged through a physical transfer process such as a postal service or other physical delivery service. More recently, electronic forms of communications have become more common. For example, facsimile machines (commonly referred to as fax machines) are used almost universally for transferring electronic copies of documents (referred to as facsimiles or faxes) between business entities.

Although messaging appliances such as fax machines have become very reliable, they are sometimes difficult to operate. One reason for this difficulty is that fax machines are typically equipped with only a small alphanumeric display and limited numeric keys. It is difficult to implement an intuitive user interface under these limitations.

Thus, there is a need for a more effective and intuitive way to instruct messaging appliances, such as fax machines, that have limited operator interface components.

SUMMARY OF THE INVENTION

A messaging appliance such as a fax machine has a scanner that captures images from paper documents. In accordance with one embodiment of the invention, instructions are given to the fax machine by writing the instructions on a sheet of paper. Each instruction consists of a keyword followed by one or more arguments. The keyword and its arguments are surrounded by predefined delimiters. The fax machine has optical character recognition software for detecting and interpreting the keywords and arguments.

Another embodiment of the invention includes the use of a printer in a messaging appliance. When a message (such as a fax) is received, it is printed on paper. In addition, the printer prints an origin identifier corresponding to the originator of the message. For example, the origin identifier might indicate a return facsimile number, from which the original message was sent. The printer also defines a reply input field on the paper, preferably next to the origin identifier. The reply input field is a region that can be marked or checked by a user. For example, the reply input field might be defined by a pair of parenthesis or brackets.

In accordance with this embodiment of the invention, the messaging appliance receives and prints a message including the origin identifier and reply input field. A user annotates the message, marks or checks the reply input field, and submits the annotated message to the messaging appliance for transmittal. The marked reply input field indicates that the annotated message is to be transmitted to the entity identified by the origin identifier. The message appliance detects that the reply input field has been marked and responds by transmitting the message to the originator of the original message.

DETAILED DESCRIPTION OF THE PREFERRED EMBODIMENT

Figure 1:
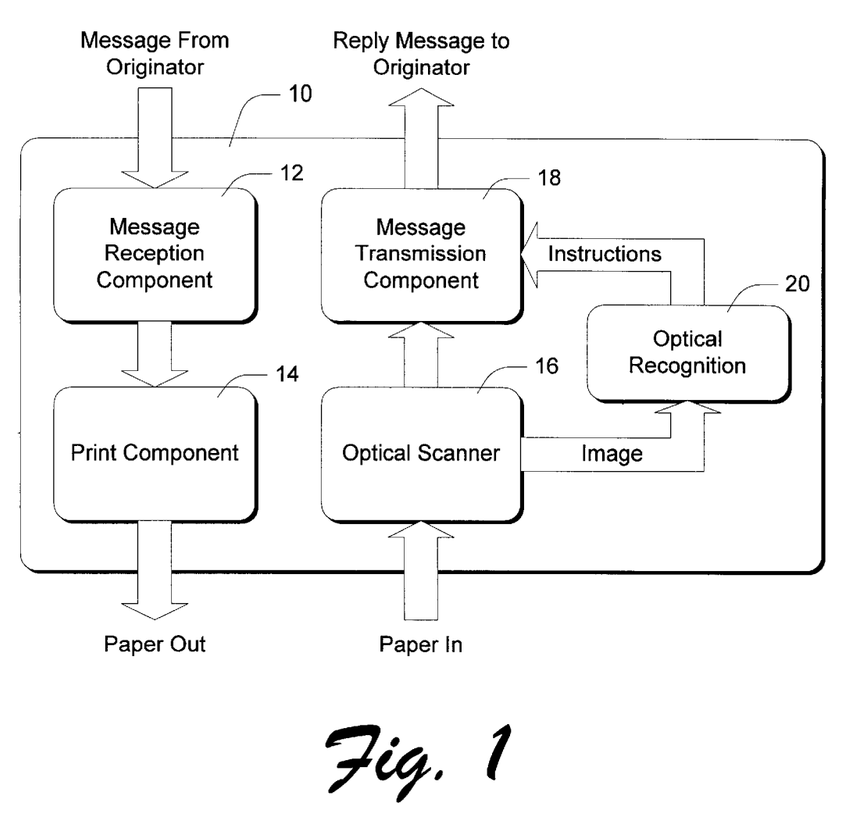
FIG. 1 is a block diagram of a messaging appliance in accordance with the invention.

FIG. 1 shows relevant components of a messaging appliance 10 in accordance with the invention. It comprises a message reception component 12, a print component 14, an optical scanner or imager 16, a message transmission component 18, and an optical recognition component 20.

In the preferred embodiment, the messaging appliance is a fax machine, in which the various illustrated components are implemented in conjunction with a microprocessor, memory, telephone modem circuits, and appropriate software instructions and components. A message in this environment consists of a digitized image on a writeable medium such as paper, which is captured or acquired by optical scanner 16. Data transmission component 18 transmits the digitized image by modulating an analog telephone signal. The signal is demodulated at a receiving fax machine, which then prints the received image using its print component 14.

In other embodiments of the invention, a message might be transmitted and rendered in different ways. For example, the message might be transmitted and received as an email message or as a voicemail message, possibly using a computer network such as the Internet.

One aspect of the invention includes a way for a user to instruct the messaging appliance regarding transmission parameters such as destination address or phone number, recipients, return address or phone number, etc. Rather than keying these parameters into the machine using a keypad, the user prepares a handwritten cover sheet. On the cover sheet, the user writes a series of keywords and associated arguments. A keyword and its arguments represent an instruction for the messaging appliance. For example, the keyword might comprise the word "TO", and the corresponding argument might be a telephone or facsimile number to which a message transmission is to be made. In the described embodiment, a keyword and its arguments are surrounded by delimiters such as brackets or the "<" and ">" characters (the "less than" and "greater than" characters).

The messaging appliance contains optical recognition logic or software 20 that identifies and recognizes the handwritten user instructions on the captured message image. In response to scanning the cover sheet with optical scanner 16, the optical recognition software examines the resulting acquired image to detect any instructions that have been written or printed on the cover sheet. If any such instructions are present, optical recognition component 20 recognizes the keywords and arguments, and correlates them with the specific instructions they represent. These instructions are used to initiate a message transmission-subsequent captured images are transmitted in accordance with the handwritten instructions.

Another aspect of the invention provides a way for a user to reply to a message without having to specifically designate a return address or facsimile number for the reply. In accordance with this aspect of the invention, print component 14 is configured to print an origin identifier in the margin of a received message. In addition, a reply input field is printed beside the origin identifier.

The user can mark up or make additions to a received message, and mark the reply input field to indicate that the annotated message is to be returned to its originator. When the annotated message is scanned, optical recognition component 20 detects that the reply input field has been checked and also interprets the origin identifier to determine a reply address or facsimile number, to which the annotated message is directed.

Figure 2:
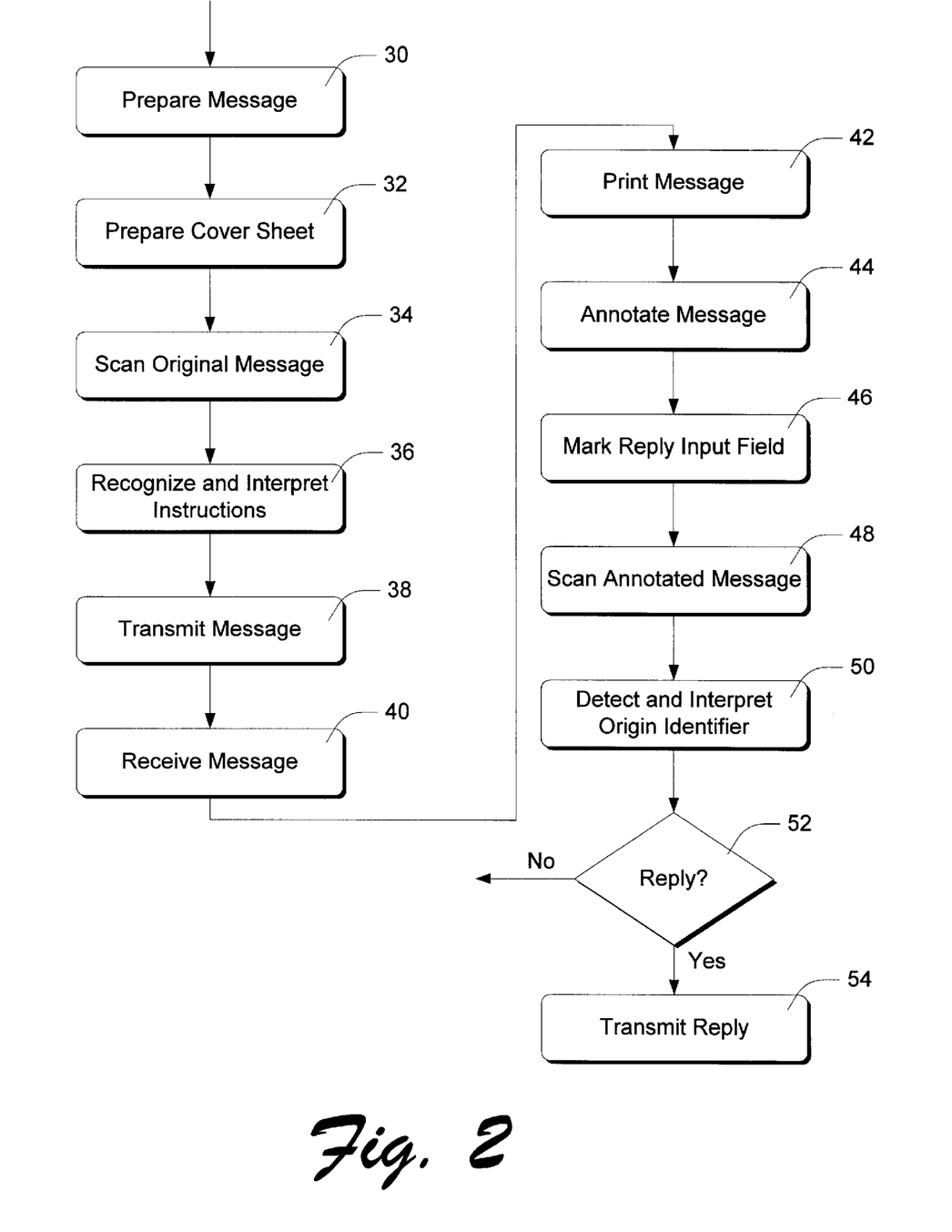
FIG. 2 is a flowchart showing preferred steps in accordance with the invention.

FIG. 2 illustrates steps performed in accordance with the invention. The steps are described in conjunction with an example of a paper-based message (FIGS. 3–6) that is transmitted and received over telephone lines using facsimile technology.

Figure 3:
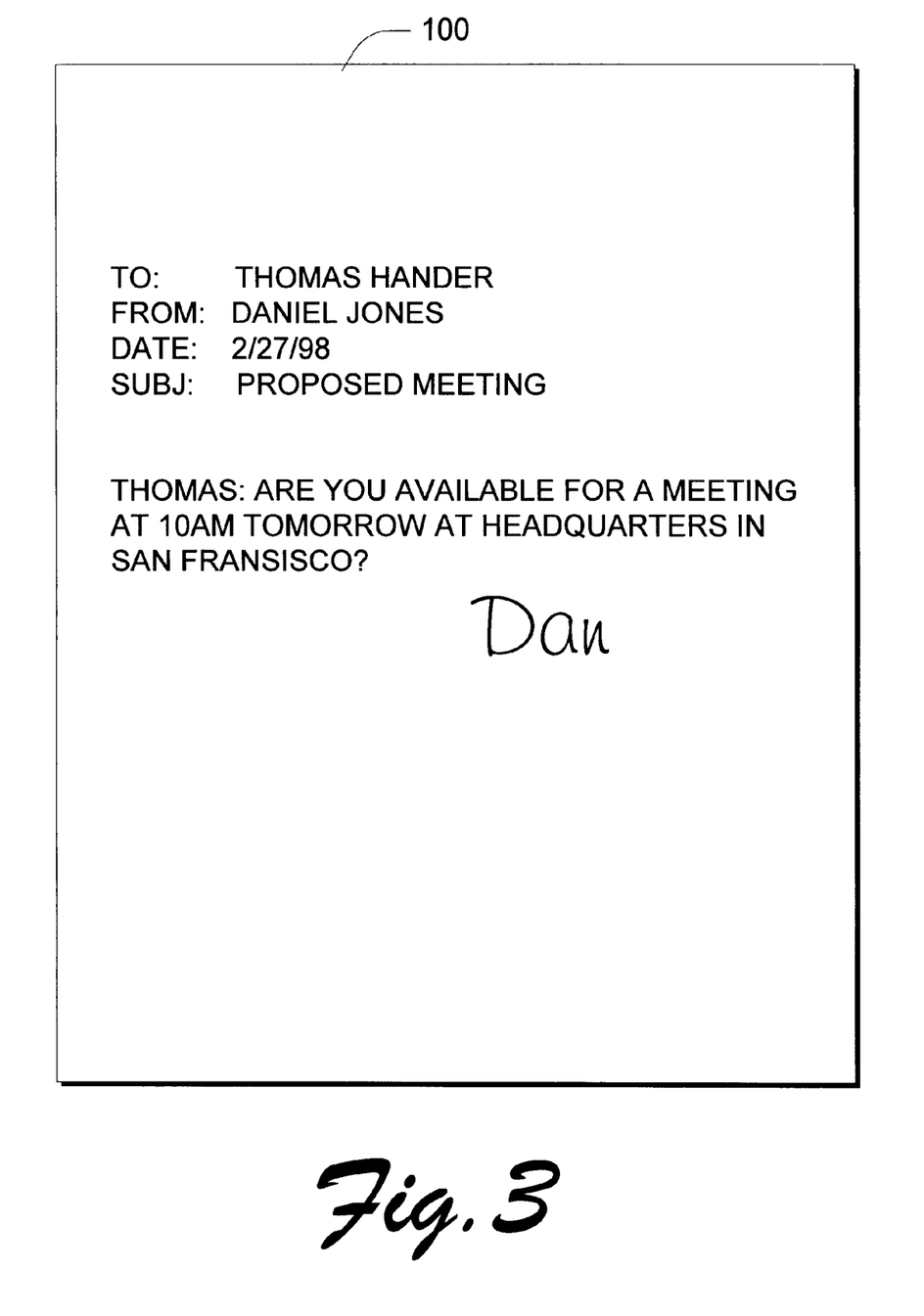
FIG. 3 illustrates a paper-based message to be transmitted in accordance with the invention.

A step 30 comprises preparing an original message on a writing medium or a printable medium. An example of such a paper-based message is shown in FIG. 3, designated by reference numeral 100. In this case, the message has been printed on paper, and includes a handwritten signature.

A step 32 comprises preparing a handwritten cover sheet containing transmission information related to message 100. An example of such a handwritten cover sheet 102 is shown in FIG. 4.

The cover sheet is prepared using a predefined syntax. This syntax defines keywords such as "TO", "FROM", "WHEN", and "SUBJ". The syntax calls for each of these keywords to be followed by an argument. Each keyword and its arguments are to be identified by surrounding delimiters. In this case, the left or opening delimiter is the "<" or "less than" symbol. The right or closing delimiter is the ">" or "greater than" symbol. Each delimited keyword and argument represents an instruction related to the accompanying message.

Figure 4:
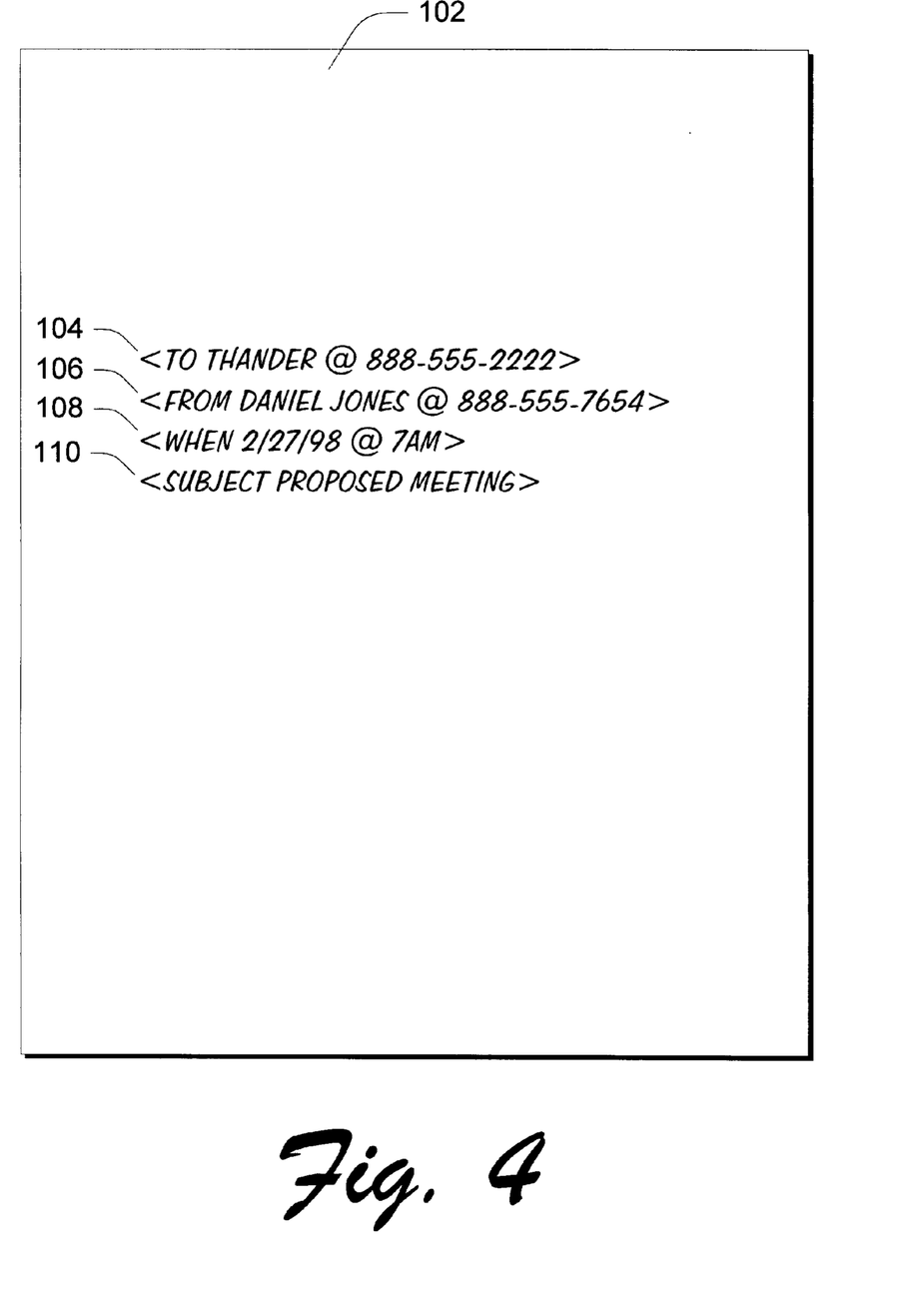
FIG. 4 illustrates a handwritten cover sheet in accordance with the invention.

In the example of FIG. 4, cover sheet 102 includes four instructions. A first instruction 104 contains the keyword "TO". The corresponding argument indicates both the name ("THANDER") and the facsimile number ("888-555-2222") of the desired recipient. An instruction 106 contains the keyword "FROM" and an associated argument specifying the name and facsimile number of the message sender. An instruction 108 contains the keyword "WHEN" and an argument indicating a date and time for the message. An instruction 110 contains the keyword "SUBJ" and an argument indicating the subject matter of the message.

A step 34 comprises scanning both the cover sheet 102 and its instructions, and any associated message pages 100. In this step, the message appliance creates digital images of the cover sheet and accompanying message pages.

A step 36 comprises recognizing and interpreting the instructions represented by the one or more keywords and associated arguments. This step is performed by optical recognition component 20 of the messaging appliance 10, using conventional optical character recognition or handwriting recognition techniques.

A step 38 comprises transmitting the message in accordance with the handwritten instructions on the cover sheet. In example shown by FIGS. 3 and 4, the message is faxed to "THANDER" at "888-555-2222". The fax transmission also indicates the name and return facsimile number specified in the "FROM" instruction, the date specified in the "DATE" instruction, and the subject specified in the "SUBJ" instruction.

Although the example is given in the context of a fax machine, actual message transmission could utilize any one of a variety of different formats. For example, images of the message sheets could be attached as files to email. Alternatively, optical character recognition could be used to convert the message to text, and the text could be inserted directly into an email message. In this case, the "TO" and "FROM" instructions would specify email addresses. As a still further alternative, the message could be converted to a voice message, and transmitted as voicemail.

A step 40 comprises receiving the message at a receiving fax machine. Again, although this example describes fax reception, the message could be received as voicemail or email.

Figure 5:
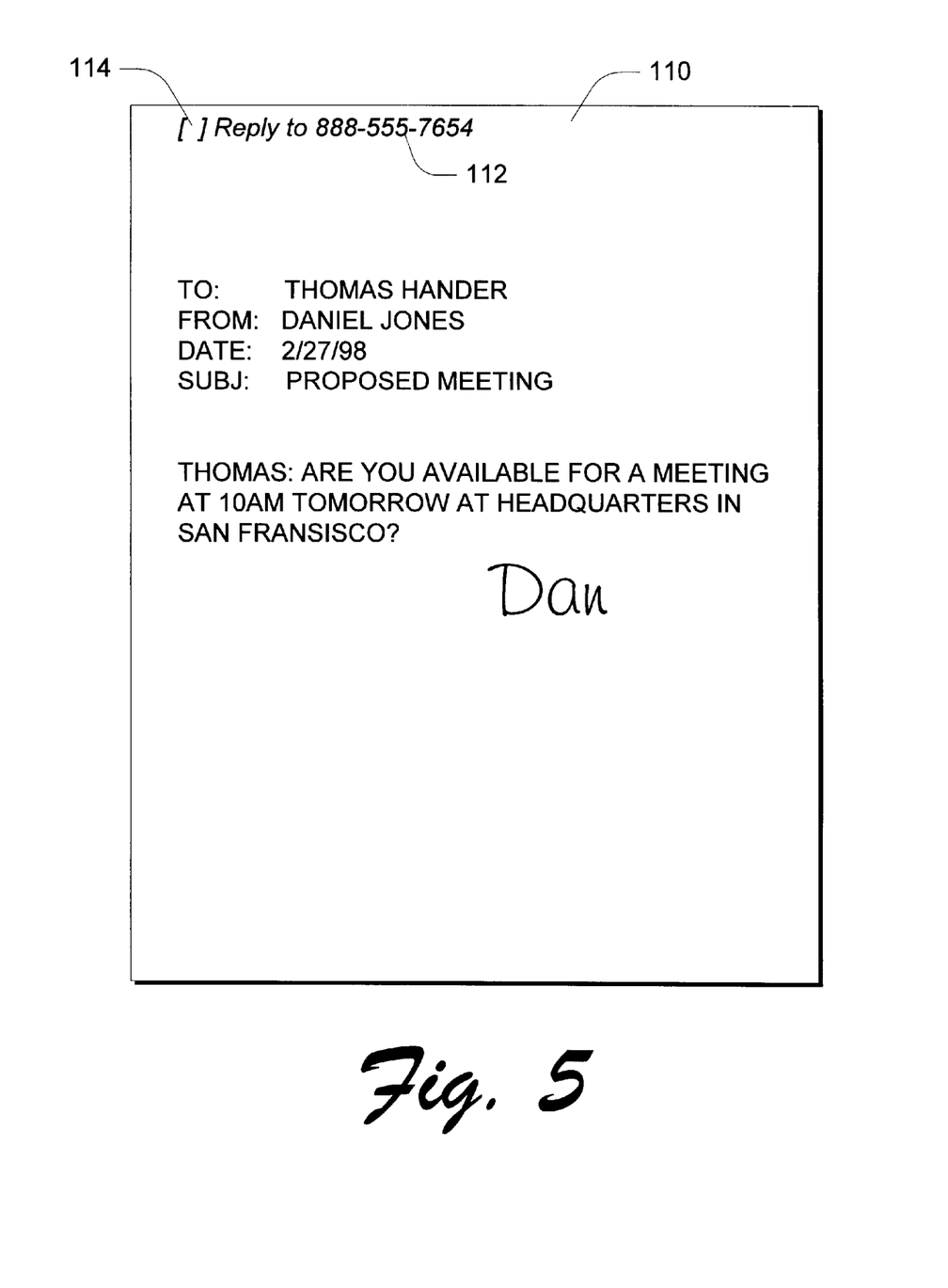
FIG. 5 illustrates a printed message in accordance with the invention.

A step 42 comprises printing the message. FIG. 5 shows an example of the printed message, designated by reference numeral 110. At the top of the first page of the message, preferably within a small margin, an origin indicator 112 is also printed. This is an optically-recognizable indicia corresponding to the message's originator. The origin indicator indicates the address of the message originator. In the case of fax transmission, the address is a telephone or facsimile number. It might alternatively be an email address or voicemail telephone number.

The origin indicator might comprise an alphanumeric representation of the address, or might be printed in some other form such as a barcode that is non-recognizable to a user. By using something other than an alphanumeric representation, it might be possible to condense the indicator, so that it occupies less space on the printed page. In the example of FIG. 5, the origin indicator is simply an alphanumeric representation of the originator's facsimile number.

A reply input field 114 is also printed or otherwise defined, beside or near the origin indicator. The reply input field 114 is a field that the user can mark to indicate that the message is to be returned to its originator (usually after annotation). In this example, the reply input field is defined by a pair of brackets surrounding an blank space: "[ ]". The words "REPLY TO" are printed beside the reply input field, preceding the origin indicator, providing a visual clue to a user regarding the meaning and function of the reply input field.

Figure 6:
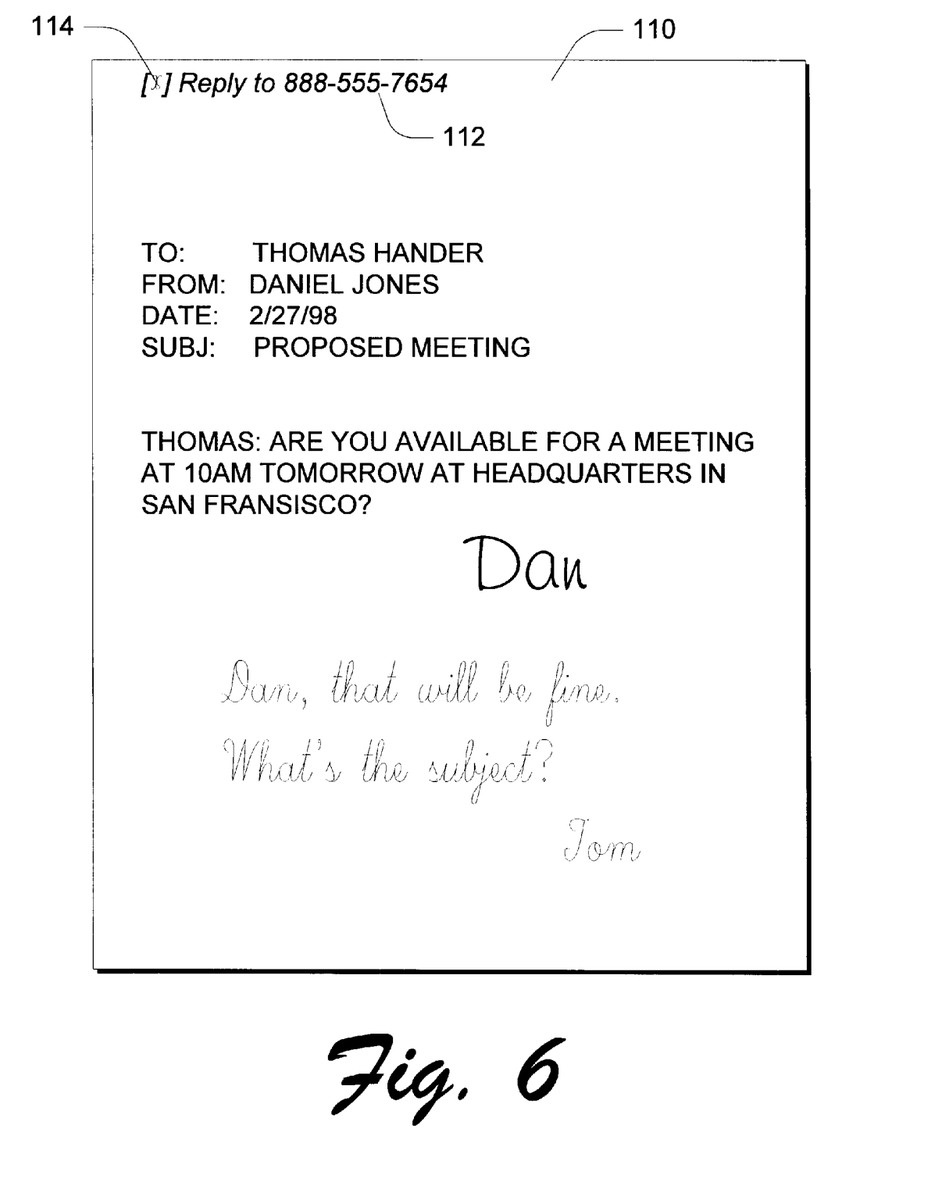
FIG. 6 illustrates a printed and annotated message in accordance with the invention.

A step 44 comprises marking up, adding to, or otherwise annotating the original message, resulting in an annotated message 116 as shown in FIG. 6. A step 46 comprises checking or marking the reply input field 114, indicating that the annotated message is to be transmitted back to the originator of the original message.

Step 48 comprises scanning the annotated message to capture a digital image of the annotated message.

Step 50, performed by optical recognition component 20, comprises detecting and interpreting the origin identifier from the captured image of the annotated message. Step 52 comprises detecting whether the reply input field 114 has been marked. If it has, a step 54 is performed of transmitting the annotated image to the message originator identified by the origin identifier. If it has not, the recipient is specified in some other way, such as by manually entering a number via a keypad, or by a handwritten cover sheet as described above.

The invention provides a simplified way to specify parameters relating to fax and other message transmissions, based on simple handwritten input. This simplification of the user interface provides convenience to the user, while also potentially lowering hardware costs by eliminating the requirement for a keypad or other input devices.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A messaging device comprising:

an optical scanner configured to capture one or more images containing a message and containing handwritten user instructions to instruct the messaging device, the handwritten user instructions comprising one or more keywords and associated arguments, wherein the one or more keywords are selected from a group comprising: SUBJ; WHEN; TO; and FROM;

character recognition logic that recognizes and interprets the handwritten user instructions from the one or more images, by interpreting the one or more keywords according to the associated arguments; and a message transmission component that transmits the message from the one or more images in accordance with the handwritten user instructions.

2. A messaging device as recited in claim 1, wherein the message transmission component is a facsimile transmission component.

3. A messaging device as recited in claim 1, wherein the message transmission component is an email transmission component.

4. A messaging device as recited in claim 1, wherein the message transmission component is a voicemail transmission component.

5. A messaging device as recited in claim 1, wherein the optical scanner is configured to capture an image containing a handwritten message.

6. A messaging device as recited in claim 1, wherein one of the arguments being a telephone number designating a destination for the message.

7. A messaging device as recited in claim 1, wherein the one or more keywords and associated arguments are noted by predefined delimiters.

8. A method of facsimile transmission, comprising:

handwriting one or more keywords and associated arguments on a writing medium, the keywords and associated arguments representing instructions for facsimile; transmission, wherein the one or more keywords are selected from a group comprising: SUBJ; WHEN; TO; and FROM;

scanning the writing medium including the one or more keywords and associated arguments with a facsimile machine;

recognizing the instructions represented by the one or more keywords and associated arguments in the facsimile machine; and in response to recognizing the instructions, transmitting a facsimile in accordance with the instructions.

9. A method as recited in claim 8, wherein one of the arguments is a telephone number designating a destination for the message.

10. A method as recited in claim 8, wherein the one or more keywords and associated arguments are noted by predefined delimiters.

11. A messaging device comprising:

a message reception component configured to receive a printable message from a message originator;

a printer that prints the received message on a print medium and that also prints an origin identifier of the message originator on the print medium;

an optical scanner configured to capture an image of the printed message after the printed message has been annotated and configured to capture one or more keywords and associated arguments;

character recognition logic configured to detect the origin identifier, the one or more keywords and associated arguments, and annotations made to a reply input field beside or near the origin identifier from the captured image; and a message transmission component configured to transmit the captured image to the message originator identified by the origin identifier when indicated by the annotations made to the reply input field beside or near the origin identifier or when indicated by the one or more keywords and associated arguments.

12. A messaging device as recited in claim 11, additionally comprising:

character recognition logic configured to detect from the captured image whether the reply input field has been marked; and message transmission component configured to transmit the captured image to the message originator only if the reply input field has been marked or if indicated by the one or more keywords and associated arguments.

13. A messaging device as recited in claim 11, wherein:

the origin identifier is an alphanumeric identification of the message originator;

the printer also defines a reply input field on the print medium;

the character recognition logic detects from the captured image whether the defined reply input field has been marked;

the message transmission component transmits the captured image to the message originator only if the defined reply input field has been marked.

14. A messaging device as recited in claim 11, wherein the origin identifier is an alphanumeric identification of the message originator.

15. A facsimile machine comprising:

a printer that prints a received facsimile on a print medium and that also prints an origin identifier on the print medium corresponding to the originator of the received facsimile;

an optical scanner configured to capture an image of the printed facsimile after the printed facsimile has been annotated and configured to capture one or more keywords and associated arguments;

character recognition logic configured to detect the origin identifier, the one or more keywords and associated arguments, and annotations made to a reply input field beside or near the origin identifier from the captured image; and the facsimile machine being responsive to the origin identifier to transmit the captured image to the message originator when indicated by the annotations to the origin identifier or when indicated by the one or more keywords and associated arguments.

16. A facsimile machine as recited in claim 15, additionally comprising:

character recognition logic is configured to detect from the captured image whether the defined reply input field has been marked; and facsimile machine configured to transmit the captured image to the message originator only if the defined reply input field has been marked or if indicated by the one or more keywords and associated arguments.

17. A facsimile machine as recited in claim 15, wherein:

the origin identifier is an alphanumeric identification of the message originator;

the printer also defines a reply input field on the print medium;

the character recognition logic detects from the captured image whether the defined reply input field has been marked;

the facsimile machine transmits the captured image to the message originator only if the defined reply input field has been marked.

18. A facsimile machine as recited in claim 15, wherein the origin identifier is an alphanumeric identification of the message originator.

* * * * *